United States Patent [19]

Eskamani

[11] 4,007,162

[45] Feb. 8, 1977

[54] ACRYLONITRILE-ACROLEIN-INDENE TERPOLYMERS

[75] Inventor: Abolghassem Eskamani, North Randall, Ohio

[73] Assignee: Standard Oil Company, Cleveland, Ohio

[22] Filed: Nov. 13, 1975

[21] Appl. No.: 631,532

[52] U.S. Cl. .................. 260/73 R; 260/67 UA
[51] Int. Cl.² .............. C08G 2/00; C08G 10/02; C08F 210/00; C08F 222/30
[58] Field of Search ............. 260/73 R, 67 UA

[56] References Cited

UNITED STATES PATENTS

| | | | |
|---|---|---|---|
| 3,154,599 | 10/1964 | Wismer | 260/73 R |
| 3,379,689 | 4/1968 | Tanaka et al. | 260/73 R |
| 3,404,133 | 10/1968 | Kern et al. | 260/73 R |
| 3,809,680 | 5/1974 | Wakefield | 260/73 R |

OTHER PUBLICATIONS

C.A., vol. 74, 1971, 43597v, "Modification of Indene Coumaront Resin by Acrolein", Macionis et al.

*Primary Examiner*—Joseph L. Schofer
*Assistant Examiner*—Herbert J. Lilling
*Attorney, Agent, or Firm*—John F. Jones; Sherman J. Kemmer

[57] ABSTRACT

Thermoplastic-thermosetting polymers having good gas barrier properties are prepared by the interpolymerization of acrylonitrile, acrolein and indene.

6 Claims, No Drawings

ACRYLONITRILE-ACROLEIN-INDENE TERPOLYMERS

The present invention relates to novel polymeric compositions which have low permeability to gases, and more particularly pertains to gas and vapor barrier materials which are composed of an olefinic nitrile, an olefinic aldehyde and indene, and to a process for preparing same.

The novel polymeric products of the present invention are prepared by polymerizing an olefinically unsaturated nitrile, such as acrylonitrile, an olefinically unsaturated aldehyde, such as acrolein, and indene.

The olefinically unsaturated nitriles useful in the present invention are the alpha,beta-olefinically unsaturated mononitriles having the structure

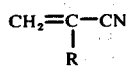

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile in the present invention is acrylonitrile.

The olefinic aldehydes most useful in this invention are acrolein and methacrolein, and acrolein is preferred.

The polymeric compositions of this invention can be prepared by any of the known general techniques of polymerization including the bulk polymerization, solution polymerization and emulsion or suspension polymerization techniques by batch, continuous or intermittent addition of the monomers and other components. The preferred method is emulsion polymerization. The polymerization is preferably carried out in aqueous medium in the presence of an emulsifier and a free-radical generating polymerization initiator at a temperature of from about 0° to 100° C in the substantial absence of molecular oxygen.

The preferred polymeric compositions embodied herein are those resulting from the polymerization of (A) from 5 to 75% by weight of at least one nitrile having the structure

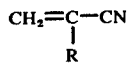

wherein R has the foregoing designation, (B) from 5 to 70% by weight of a member selected from the group consisting of acrolein and methacrolein and (C) from 5 to 50% by weight of indene.

More specifically, the present invention can be illustrated in the polymerization of a mixture of acrylonitrile, acrolein and indene to form a product having good impermeability to gases and vapors when exposed to said gases and vapors in the form of a film or thin sheet.

The novel polymeric products of the present invention are thermoplastic materials up to about 210° C and which can be thermoset at elevated temperatures above about 210° C. These polymeric materials can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and are useful in the packaging industry being particularly useful in the manufacture of bottles, film and other types of containers for liquids and solids.

In the following illustrative examples, the amounts of ingredients are expressed in parts by weight unless otherwise indicated.

EXAMPLE 1

A terpolymer of acrylonitrile, acrolein and indene was prepared using the following ingredients:

| Ingredient | Parts |
|---|---|
| acrylonitrile | 55 |
| acrolein | 21 |
| indene | 24 |
| emulsifier (Gafac RE-610)* | 7.7 |
| potassium persulfate (initiator) | 0.97 |
| water (distilled) | 480 |

*A mixture of R-O-(CH$_2$CH$_2$O-)$_n$PO$_3$M$_2$ and [R-O-(CH$_2$CH$_2$O-)$_n$]$_2$PO$_2$M wherein n is a number from 1 to 40, R is an alkyl or alkaryl group and preferably a nonyl phenyl group, and M is hydrogen, ammonia or an alkali metal, which composition is sold by GAF Corporation.

The ingredients were placed in a polymerization reactor, swept with nitrogen to remove substantially all molecular oxygen, and the polymerization was allowed to proceed in the sealed reactor with constant agitation at 58° C for about 16 hours. The polymer was isolated from the resulting latex by pouring the latex into a hot aqueous solution of alum (40% aluminum sulfate). The thus coagulated polymer was isolated by filtration and was washed thoroughly with distilled water to remove unreacted monomers, emulsifier, and other impurities. The solid resin was dried for several hours at reduced pressure and 40° C to give a 60% yield. This resin was processed in the Brabender plasticorder test at 185° C and 35 rpm and was found to have a torque value of 2000 meter grams. The resin was compression molded into test bars and they were found to have the following properties: ASTM heat-distortion temperature 92° C, tensile strength 4.5 × 10$^3$ psi, flexural strength 3.62 × 10$^3$ psi, flexural modulus 5.08 × 10$^5$ psi, softening point 104°–137° C, ASTM oxygen transmission rate 2.0, ASTM water vapor transmission rate (100% relative humidity) 5.6, and ASTM water vapor transmission (90% relative humidity) 5.0. This resin was found to be thermoplastic when processed at temperatures below about 210° C, and it was cured to a thermoset material at temperatures above about 210° C.

EXAMPLES 2–15

In a similar manner, a series of terpolymers of acrolein, acrylonitrile and indene were prepared and evaluated, and these are summarized in the following table:

| Example | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| water | 475 | 600 | 480 | 500 | 830 | 870 | 870 | 870 | 850 | 1160 | 850 | 850 | 810 | 860 |

-continued

| Example | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| emulsifier (Gafac) | 7.6 | 9 | 7.7 | 5 | 18.4 | 14.5 | 17.4 | 26.1 | 14.1 | 11.6 | 8.5 | 8.5 | 8.1 | 7.2 |
| $K_2S_2O_8$ | 1.0 | 1 | 0.97 | 0.5 | 2.75 | 2.9 | 2.9 | 2.9 | 2.8 | 2.9 | 2.8 | 2.8 | 2.7 | 2.9 |
| acrolein | 25 | 11 | 21 | 10 | 8 | 14.5 | 24 | 24 | 4.5 | 24.5 | 67.5 | 20.5 | 69.2 | 24.3 |
| acrylonitrile | 46 | 57.5 | 55 | 60 | 43 | 68 | 47 | 47 | 48.5 | 47.0 | 6.0 | 40 | 4.9 | 46.8 |
| indene | 29 | 31.5 | 24 | 30 | 49 | 17.5 | 29 | 29 | 47.0 | 28.5 | 26.5 | 39.5 | 25.9 | 28.9 |
| % yield | 35 | 33 | 50 | 35 | 71.5 | 85 | 68 | 84 | 89 | 86 | 52 | 81 | 44.5 | 77 |

The polymers described in the table were found to have properties comparable to those shown in the case of the polymer of Example 1. The polymer of Example 2, for instance, was found to have an ASTM heat-distortion temperature of 77° C, a flexural strength of $1.17 \times 10^3$, a flexural modulus of $3.92 \times 10^5$, and a softening point of 76°–82° C. The polymer of Example 4 was found to have an ASTM oxygen transmission rate of 0.3, ASTM water vapor transmission rate at 100% relative humidity of 8.5, and an ASTM water vapor transmission at 90% relative humidity of 7.7. All of these polymers were found to be thermoplastic at fusion temperatures below about 210° C and to be thermosetting at temperatures above about 210° C.

I claim:

1. A terpolymer composition resulting from the polymerization in the presence of a free-radical generating polymerization initiator of
   A. from 5 to 75% by weight of at least one nitrile having the structure

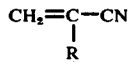

wherein R is hydrogen, a lower alkyl group having from 1 to 4 carbon atoms, or a halogen,
   B. from 5 to 70% by weight of a member selected from the group consisting of acrolein and methacrolein, and
   C. from 5 to 50% by weight of indene.

2. The composition of claim 1 wherein (A) is acrylonitrile.

3. The composition of claim 2 wherein (B) is acrolein.

4. The process comprising polymerizing in an aqueous emulsion in the presence of a free-radical generating polymerization initiator in the substantial absence of molecular oxygen at a temperature of from about 0° to 100° C a mixture of
   A. from 5 to 75% by weight of at least one nitrile having the structure

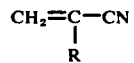

wherein R is hydrogen, a lower alkyl group having from 1 to 4 carbon atoms, or a halogen,
   B. from 5 to 70% by weight of a member selected from the group consisting of acrolein and methacrolein, and
   C. from 5 to 50% by weight of indene.

5. The process of claim 4 wherein (A) is acrylonitrile.

6. The process of claim 5 wherein (B) is acrolein.

* * * * *